(12) United States Patent
Kaeser

(10) Patent No.: US 9,957,110 B2
(45) Date of Patent: May 1, 2018

(54) SECURING ELEMENT FOR SECURING A CARRIAGE ON AN ENDLESS CONVEYOR, CARRIAGE, CONVEYOR APPARATUS AND SECURING METHOD

(71) Applicant: Interroll Holding AG, Sant'Antonino (CH)

(72) Inventor: Uwe Kaeser, Mudau (DE)

(73) Assignee: INTEROLL HOLDING AG, Sant Antonino (CH)

( * ) Notice: Subject to any disclaimer, the term of this patent is extended or adjusted under 35 U.S.C. 154(b) by 0 days. days.

(21) Appl. No.: 15/501,501

(22) PCT Filed: Feb. 17, 2016

(86) PCT No.: PCT/EP2016/000272
§ 371 (c)(1),
(2) Date: Feb. 3, 2017

(87) PCT Pub. No.: WO2016/131546
PCT Pub. Date: Aug. 25, 2016

(65) Prior Publication Data
US 2017/0341867 A1    Nov. 30, 2017

(30) Foreign Application Priority Data
Feb. 20, 2015 (DE) ........................ 10 2015 002 185

(51) Int. Cl.
*B65G 17/32* (2006.01)
*B65G 17/12* (2006.01)
(Continued)

(52) U.S. Cl.
CPC ............. *B65G 17/12* (2013.01); *B65G 17/40* (2013.01); *B65G 23/32* (2013.01)

(58) Field of Classification Search
CPC ........ B65G 17/42; B65G 17/12; B65G 17/16; B65G 17/20; B65G 17/485
(Continued)

(56) References Cited

U.S. PATENT DOCUMENTS 3,001,634 A * 9/1961 Bauder .................. B65G 9/002
104/89
3,724,391 A * 4/1973 Velde .................... B61B 10/025
104/172.4

(Continued)

FOREIGN PATENT DOCUMENTS

DE            923777        1/1955
DE         4316852 A1      11/1993
(Continued)

OTHER PUBLICATIONS

International Search Report.
German Office Action.

*Primary Examiner* — James R Bidwell
(74) *Attorney, Agent, or Firm* — Gerald E. Hespos; Michael J. Porco; Matthew T. Hespos

(57) ABSTRACT

A mounting element (1) for mounting a trolley (29) to a continuous conveyor (30) of a conveyor device has at least two articulated parts (2, 3) connected to one another for articulation. A first of the articulated parts (2) is set-up for articulation of the mounting element (1) to the continuous conveyor (30) and a second of the articulated parts (3) is set-up for connecting the mounting element (1) to the trolley (29).

7 Claims, 4 Drawing Sheets

(51) Int. Cl.
*B65G 17/40* (2006.01)
*B65G 23/32* (2006.01)

(58) Field of Classification Search
USPC .................................... 198/682, 680, 683
See application file for complete search history.

(56) References Cited

U.S. PATENT DOCUMENTS

| | | | | |
|---|---|---|---|---|
| 4,411,336 A | * | 10/1983 | Anders | B61B 13/12 |
| | | | | 186/28 |
| 5,253,742 A | * | 10/1993 | Dooley | B65G 17/485 |
| | | | | 198/377.1 |
| 5,791,451 A | | 8/1998 | Brown | |
| 6,129,350 A | | 10/2000 | St. Ours | |
| 7,500,551 B1 | * | 3/2009 | Greene | B65G 17/123 |
| | | | | 198/475.1 |
| 8,376,356 B2 | * | 2/2013 | Gentle | B65H 29/04 |
| | | | | 271/204 |
| 2015/0225177 A1 | * | 8/2015 | Schonenberger | B65G 17/20 |
| | | | | 198/687.1 |

FOREIGN PATENT DOCUMENTS

| | | |
|---|---|---|
| DE | 4329384 A1 | 3/1995 |
| DE | 202014007861 U1 | 12/2014 |
| EP | 0117791 | 9/1984 |
| EP | 1048570 | 11/2000 |

\* cited by examiner

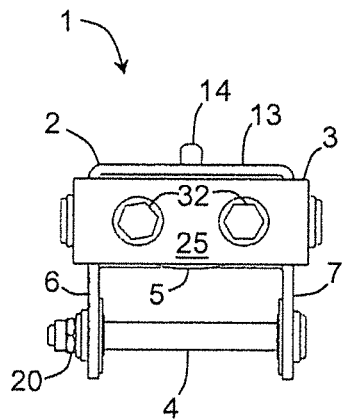
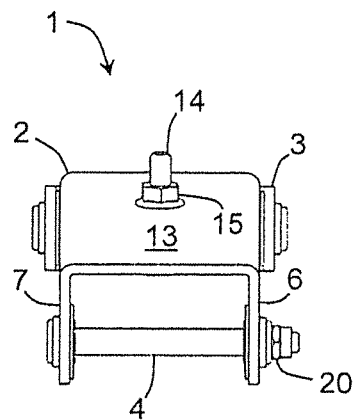
Fig. 3    Fig. 4
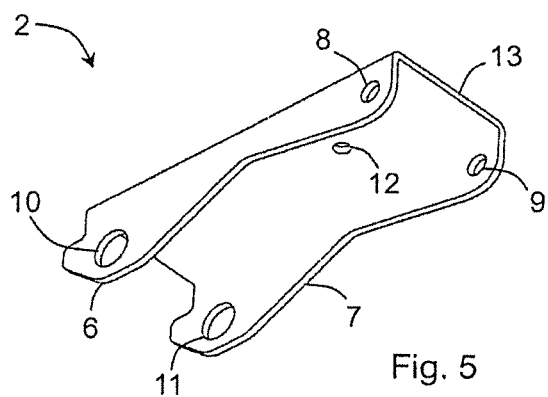
Fig. 5

SECURING ELEMENT FOR SECURING A CARRIAGE ON AN ENDLESS CONVEYOR, CARRIAGE, CONVEYOR APPARATUS AND SECURING METHOD

BACKGROUND

1. Field of the Invention

The present invention relates to a mounting element for mounting a trolley to a continuous conveyor means of a conveyor device, a trolley having such mounting element, which can be mounted to a continuous conveyor means of a conveyor device with the mounting element, a conveyor device having at least one continuous conveyor means and at least one trolley, which is mounted to the continuous conveyor means with the mounting element, as well as a method for mounting a trolley to a continuous conveyor means of a conveyor device.

2. Description of the Related Art

Conveyor devices having continuous conveyor means and trolleys, which are moved or transported by the continuous conveyor means are for example known from EP 0 930 248 B1 or from EP 1 375 390 A2. Moreover, a great number of further conveyor devices is known, in which trolleys are transported along a mostly revolving, closed and thus continuous conveyor path. To this end, the conveyor devices have continuous conveyor means in the form of chains, rubber chains or V-belts, to which the trolleys are connected and by which the trolleys are torn or often also carried. For the connection between continuous conveyor means and trolleys it is for example known to provide elongated leaf springs, which are connected to both the continuous conveyor means and the trolley. Owing to the resilience of the leaf springs, trolleys can be conveyed by the continuous conveyor means in particular at turn-round points of the conveying path along perpendicular, semi-circular path portions without the trolleys having to suffer any major mechanical stress provided that the diameter of the path portion is sufficiently large in comparison with the extension of the trolley in the conveying direction. However, in the case of semi-circular path portions having a smaller diameter, even spring leaves cannot prevent the trolley from suffering mechanical stress, such that it may warp or deform when passing through the semi-circular path portion. At worst, such mechanical impact leads to a standstill or a damage of the conveyor device. As the space required by a conveyor device also is a critical economic factor, it is desirable to achieve turn-back paths for the trolleys that are as small as possible, i.e. it is desired that semi-circular path portions having diameters as small as possible can be smoothly passed by trolleys.

Therefore, it is the object of the invention to create a mounting element, a trolley, a conveyor device and a method for mounting a trolley to a continuous conveyor means of a conveyor device, wherein trolleys are enabled to pass through semi-circular path portions without impairment even in the case that their diameter is small in comparison with the extension of the trolley in the conveying direction. In particular, it is an object of the invention to permit relative movements between the continuous conveyor means and the trolley, i.e. to enable greater relative movements between the continuous conveyor means and the trolley.

SUMMARY

In the present invention, the mounting element comprises two articulatedly connected articulated parts, one first articulated part of which is articulated to the continuous conveyor means or articulatedly connected therewith, respectively, whereas a second of the articulated parts is connected to the trolley. As a result, the first articulated part and the second articulated part are movable relative to the continuous conveyor means and moreover, at least the first articulated part is movable relative to the trolley. Owing to these two articulated parts, the trolley is conferred a great freedom of movement relative to the continuous conveyor means. Therefore, when passing through semi-circular path portions, whose diameter is small in comparison with the extension of the trolley in the conveying direction, the trolley can gradually detach partially or completely from the continuous conveyor means such that mechanical stress acting on the trolley or the continuous conveyor means can be avoided. Herein, the continuous conveyor means can move the trolley via the mounting element in both a tearing manner and a pushing manner. Very much in general, the direction into which the trolley is moved or transported by the continuous conveyor means is not of any importance for the mounting element or the articulated connections between the continuous conveyor means and the mounting element and between the two articulated parts of the mounting element.

An overload of a conventional connection of continuous conveyor means and trolley can be prevented due to the articulated connection. In particular, an overload of conventional leaf springs, such as can result from a strong deflection due to relative movements influenced by tolerances, can be prevented. Moreover, it is prevented that conventional leaf springs snap out in the case of a manual movement of the trolley, i.e. when changing a charge.

In one embodiment of a conveyor device according to the invention, the first articulated part is articulated to the continuous conveyor means in such a way that it is rotatable about a first axis of rotation that is perpendicular to the conveying direction of the continuous conveyor means, and the first and the second articulated parts are articulatedly connected with one another in such a way that they are rotatable about a second axis of rotation that is perpendicular to the conveying direction and spaced apart from the first axis of rotation. The continuous conveyor means may be any desired continuous conveyor means provided that it is suitable for being articulatedly connected to the first articulated part. In particular, the continuous conveyor means may be a conveyor chain or a chain or a rubber chain.

The specific implementation of the articulated connection between the first articulated part and the continuous conveyor means and the first articulated part and the second articulated part may be realized in any desired manner. Preferably, an elongated bolt element is provided. The elongated bolt element has a center part, a threaded end portion having a thread, a bolt head opposed to the threaded part and a spacer sleeve. The threaded portion may have a maximum lateral extension that is smaller relative to the center part.

Furthermore, the mounting element may comprise at least first and second surface portions parallel to one another. The first surface portion is provided with a first through hole and the second surface portion is provided with a second through hole. A first bearing bushing or articulated bushing is provided in the first through hole and a second bearing bushing or articulated bushing is provided in the second through hole. Preferably, the spacer sleeve is arranged in the first bearing bushing such that, together with the first bearing bushing, it forms a first slide bearing. Preferably, the bolt head or screw head is arranged in the second bearing bushing such that, together with the second bearing bushing, it forms a second slide bearing.

Alternatively, a mounting element can be provided that comprises, at least for one of the articulated connections, an elongated bolt element having a center part with a maximum lateral extension, a threaded end portion having a thread with a smaller maximum lateral extension relative to the center part and opposite thereto an abutment surface end portion having an abutment surface having a larger maximum lateral extension relative to the center part, and at least first and second surface portions parallel to one another. The first surface portion is provided with a first through hole, whose maximum lateral extension is smaller than the maximum lateral extension of the center part of the bolt element and larger than or equal to the maximum lateral extension of the threaded end portion of the bolt element. The second surface portion is provided with a second through hole, whose maximum lateral extension is smaller than the maximum lateral extension of the abutment surface of the bolt element and larger than or equal to the maximum lateral extension of the center part of the bolt element.

The bolt element may pierce through the first through hole and the second through hole so that the threaded end portion projects from the first through hole at a side of the first surface portion facing away from the second surface portion and a screw nut is screwed onto the thread.

If the bolt element is provided for the articulated connection between the mounting element and the continuous conveyor means, the first and second surface portions are parts of the first articulated part. If the bolt element is provided for the articulated connection between the first and the second articulated part, the first and second surface portions may be parts of the first articulated part or they may be parts of the second articulated part or each of the surface portions may be a part of the other one of the articulated parts. For the articulated connection between the mounting element and the continuous conveyor means, the bolt element moreover pierces through a though hole formed in the continuous conveyor means having a maximum lateral extension that is larger than or equal to the maximum lateral extension of the center part and smaller than the maximum lateral extension of the abutment surface end portion and/or the bolt head. In the articulated connection between the first and the second articulated part, the bolt element, however, pierces through at least one through hole that is formed in at least one articulation portion of one of the articulated parts and that has a maximum lateral extension that is larger than or equal to the maximum lateral extension of the center part and smaller than the maximum lateral extension of the abutment surface end portion. The articulation portion may for example be formed by one, two or a plurality of surface portions that are similar to the surface portions described. In this embodiment of the present invention, the special dimensioning of the bolt element and of the through holes does not only lead to the realization of a simple and reliable articulated connection between the mounting element and the continuous conveyor means or between the articulated parts but it is also ensured that the screw can be tightened only to such extent that it can be avoided that the surface portions are bent out of shape or that the movability of the articulated parts is impaired by an excessively strong tightening of the screw.

In one embodiment, the mounting element has at least one damping means for damping strokes of the mounting element at the continuous conveyor means. By means of the damping means, in particular a sound generation upon striking of the mounting element at the continuous conveyor means is dampened in order to ensure that the conveyor installation comprising such mounting element operates as noiseless as possible. Striking of the mounting element at the continuous conveyor means often occurs during the return travel of the continuous conveyor means due to a possible slackening thereof.

The articulated parts of the mounting element may at least partially be made of a substantially rigid material, such as a metal or a plastic material. However, the articulated parts also may be made at least partially of an elastic material. At least one of the articulated parts may be made of a sheet metal material or a metal plate material. However, both of the articulated parts also may be made of such material. Thus, an articulated part may simply be punched or cut out of a sheet metal material. It is also possible to first punch or cut out a flat blank of the sheet metal material and to then give this blank a final shape of the articulated part by bending the respective portions.

In one embodiment, the mounting element at least partially has a U-shaped cross section. For example, the mounting element may continuously have a U-shaped cross section or at least one of the articulated parts at least partially or continuously may have a U-shaped cross section or both of the articulated parts at least partially or continuously may have a U-shaped cross section. For example, a U-shaped cross section of the articulated parts is preferred if the continuous conveyor means is a conveyor chain since in this case, chain links of the conveyor chain can be received in the respective portions having the U-shaped cross section, which has an advantageous effect with regard to the stabilization of the trolley mounted to the continuous conveyor means by using the mounting element in directions perpendicular to the conveying direction of the continuous conveyor means.

Very much in general, the trolley can be any trolley, for example a container containing loose material or bulk material. Particularly preferably, however, the trolley has a sorting device or a cross-sorting device. Such sorting devices or cross-sorting devices may respectively have a conveyor belt that can be driven transversely to the conveying path and that respectively is guided across idler pulleys having axes of rotation extending in the direction of the conveying path. A transverse drive of the conveyor belts may be effected as known in prior art by using corresponding drive means that optionally can be selected for interaction.

BRIEF DESCRIPTION OF THE DRAWINGS

FIG. 3 shows a front view of the mounting element of FIG. 1.
FIG. 4 shows a back view of the mounting element of FIG. 1.
FIG. 5 shows a first articulated part of the mounting element of FIG. 1.

DETAILED DESCRIPTION

Figure 1:
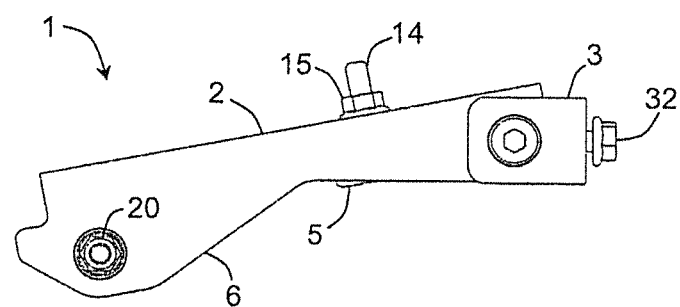
FIG. 1 shows a lateral view of a mounting element.
Figure 2:
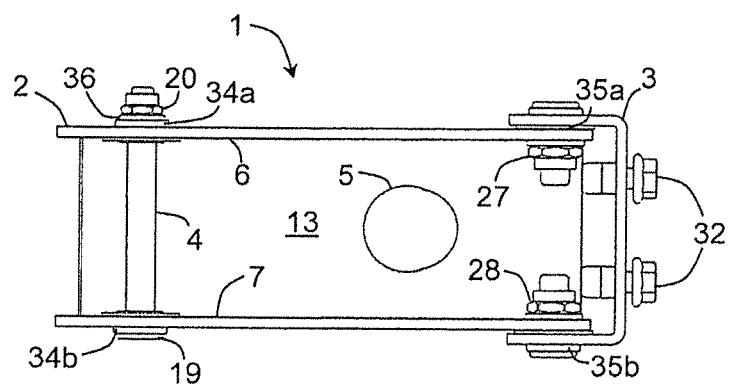
FIG. 2 shows the mounting element of FIG. 1 from below.

FIGS. 1 to 4 illustrate different views of a mounting element 1 according to the invention for mounting a trolley to a continuous conveyor means of a conveyor device. The mounting element 1 comprises a first articulated part 2, which is illustrated in a three-dimensional view in FIG. 5, and a second articulated part 3, which is illustrated in a three-dimensional view in FIG. 7, that are articulatedly connected to one another, as well as an elongated bolt element 4, which is illustrated in a three-dimensional view in FIG. 6, and a damping element 5.

The first articulated part 2 is elongated and has a U-shaped cross section, wherein the U-profile is open towards the bottom in FIG. 1. However, the leg length of the U-profile changes in such a way over the length of the first articulated part 2 that side walls 6 and 7 of the first articulated part 2 that are parallel with regard to one another show a V-shaped course. At an end portion of the first articulated part 2 facing the second articulated part 3, a first through hole 8 is formed in the side wall 6 and in the side wall 7, a second through hole 9 is formed, wherein the through holes 8 and 9 are aligned with each other. Also at an end portion of the first articulated part 2 facing away from the second articulated part 3, a third through hole 10 is formed in the side wall 6, while in the side wall 7, a fourth through hole 11 is formed. Also the third through hole 10 and the fourth through hole 11 are aligned with each other. A fifth through hole 12 is provided in a bottom wall 13 of the first articulated part 2 connecting the side walls 5.

A bearing bushing 34a of a slide bearing is pressed into through hole 10. A bearing bushing 34b of a slide bearing is pressed into through hole 11. Accordingly a bearing bushing 35a of a slide bearing is pressed into through hole 8 and a bearing bushing 35b of a slide bearing is pressed into through hole 9.

The damping element 5 is a rubber buffer, which is arranged at a side facing the side walls 6 and 7 at the bottom wall 13 of the first articulated part 2. By means of a screw 14 piercing through the through hole 12 in the bottom wall 13 and a nut 15 screwed to a side of the bottom wall 13 facing away from the side walls 6 and 7, the rubber buffer is mounted to the bottom wall 13.

Figure 6A:
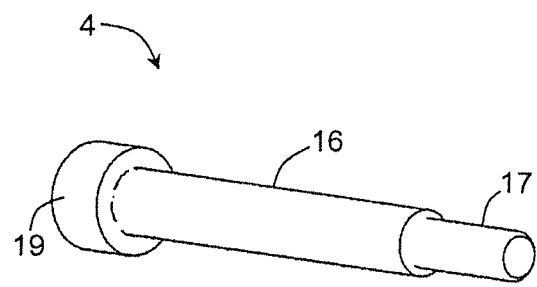
FIG. 6*a* shows a bolt element.

The bolt element 4 illustrated in FIG. 6a and having a round cross section has a center part 16, a threaded end portion 17 having a thread and opposed thereto a screw head 19. Herein, the diameter of the center part 16 is larger than the diameter of the threaded end portion 17, wherein, however, it is smaller than the diameter of the screw head 19. The diameters of the third through hole 10 and the fourth through hole 11 in the side surfaces 6 and 7, which are formed at the end portion of the first articulated part 2 facing away from the second articulated part 3, are dimensioned such as to be in accordance with the extensions of the bolt element 4. Preferably through hole 10 and through hole 11 have an identical diameter. The diameter of the fourth through hole 11 is greater than the diameter of the screw head 19, such that the screw head 19 is at least partially receivable in the fourth through hole 11. In the fourth through hole 11, the bearing bushing 34b of the slide bearing is arranged. The cylindrical screw head 19 serves as a shaft for the slide bearing, whose bearing bushing 34b is pressed into the fourth through hole 11 of the mounting element 1.

The third through hole 10 in the side wall 7 has a diameter that is larger than the diameter of a spacer sleeve 36 arranged at the threaded end portion 17. Thus, the spacer sleeve 36 may at least be partially receivable in the third through hole 10. In particular, the spacer sleeve 36 may serve as a shaft portion for the slide bearing.

With the threaded end portion 17 ahead, the bolt element 4 is first sticked through the fourth through hole 11 and subsequently through the third through hole 10, such that it pierces through the fourth through hole 11 and the third through hole 10 and the threaded end portion 17 projects from the third through hole 10 at a side of the side wall 6 facing away from side the side wall 7. Already while the bolt element 4 is being arranged or after arrangement of the bolt element 4, the spacer sleeve 36 is arranged at the threaded end portion 17. A screw nut 20 is screwed onto the thread of the threaded end portion 17 projecting from the third through hole 10. The spacer sleeve 36 has an outer diameter that is identical with the outer diameter of the screw head 19. The spacer sleeve 36 has in inner diameter that is smaller than the outer diameter of the center part 16 of the bolt element 4. Thus, the movement of the spacer sleeve is limited due to the center part 16, on the one hand, and due to the screw nut 20, on the other hand. Also, the spacer sleeve 36 substantially limits the screwing path of the screw nut 20 on the threaded end portion 17. Consequently, this enables a fixedly screwed connection of the screw nut 20 at the bolt element 4 with a predetermined screwing path without forces being transmitted onto the articulated part 2. Thus, the articulated part 2 is advantageously not deformed.

Figure 6B:
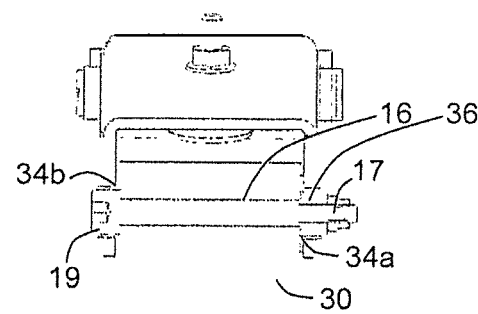
FIG. 6*b* shows a cross section of the first articulated part of the mounting element of FIG. 1.

FIG. 6b shows a sectional view of the first articulated part with the conveyor chain 30 mounted thereto. As can be seen, screw head 19 is arranged as shaft portion in the slide bearing and, on the other hand, the slide bearing, in particular bearing bushing 34b of the slide bearing, is arranged in the fourth through hole 11. On the opposite side, bearing bushing 34a of a slide bearing is arranged in through hole 10 and spacer sleeve 36, whose outer diameter is identical with the outer diameter of the screw head 19, is arranged in the articulated bushing or bearing bushing 34a, respectively as shaft portion of the slide bearing. Thus, the bolt element 4 forms a rotational axis about which the mounting element 1 is rotatable relative to the conveyor chain 30.

As can be inferred from FIG. 6b, the bolt element 4 is secured by the fact that the respective outer diameters of the screw head 19 and the spacer sleeve 36 are larger than the diameter of the through hole of the conveyor chain, through which the bolt element 4 extends. As a result, a translation of the bolt element along the through hole is prevented. Further the bolt element is held in the mounting element 1 by means of the through holes 10 and 11.

Figure 7:
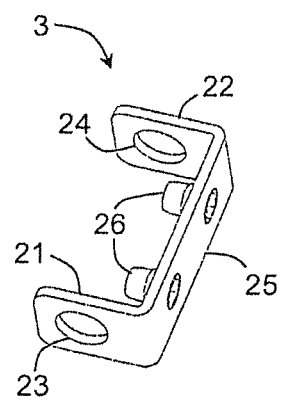
FIG. 7 shows a second articulated part of the mounting element of FIG. 1.

Similar to the first articulated part 2, also articulated part 3 that can be seen in FIG. 7, is formed to have a U-shaped profile. In comparison with the first articulated part 2, the second articulated part 3, however is shorter, wherein its length substantially corresponds with a length of the side walls 6 and 7 of the first articulated part 2 at the end portion thereof facing the second articulated part 3. Two parallel side walls 21 and 22 of the second articulated part 3 form the legs of the U-profile. In the side wall 21 of the second articulated part 3, a through hole 23 is formed and in the side wall 22 of the second articulated part 3, a through hole 24 is formed, which are aligned with each other. Through hole 21 and through hole 23 have an identical diameter. In particular, through hole 21, through hole 23, through hole 10 and through hole 11 have an identical diameter.

A bottom plate 25 connects the side walls 21 and 22. At a side facing the side walls 21 and 22 of the second articulated part 3, two projections 26 with an inside thread are projecting, which are open towards a side of the bottom plate 25 facing away from the side walls 21 and 22.

In the mounted condition of the mounting element 1 shown in FIG. 1, the second articulated part 3, is tilted by 90° with respect to the first articulated part 2, such that the side walls 21 and 22 of the second articulated part 3 that are parallel to one another, face the first articulated part 2 and that the end portion of the first articulated part 2 facing the second articulated part 3 is received between the side walls 21 and 22 of the second articulated part 3. Herein, the first through hole 8 is aligned with the through hole 23 and the second through hole 9 is aligned with the through hole 22. All of the through holes 8, 23, 9 and 22 are aligned with one another and form a rotational axis.

A screwed connection 27 extends through the aligned through holes 8 and 23 and a screwed connection 28 extends through the aligned through holes 9 and 24. By means of the screwed connections 27 and 28, the first articulated part 2 and the second articulated part 3 are articulatedly connected with one another, such that each of the articulated parts 2 and 3 is rotatable about these screwed connections 27 and 28 relative to the respective other articulated part 2 and 3. Moreover, in the through holes 8 and 9, the bearing bushings or articulated bushings 35a and 36, respectively are arranged which, together with the corresponding screw heads and/or spacer sleeves, form slide bearings.

Figure 8:
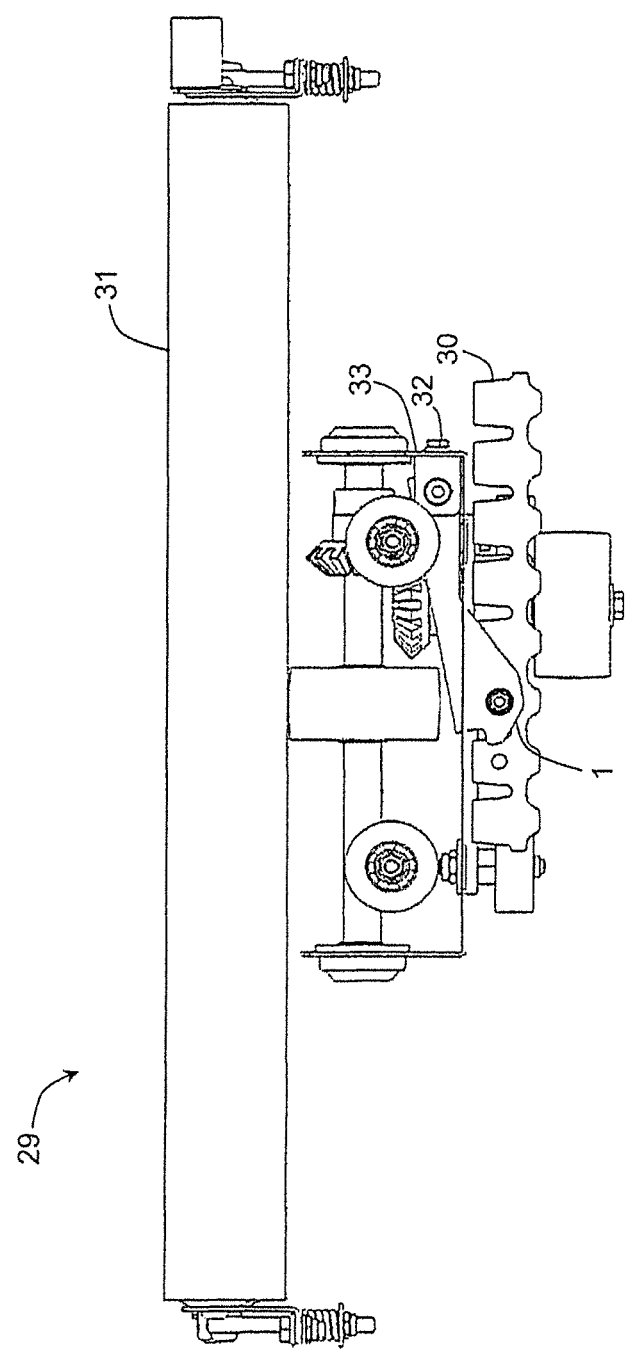
FIG. 8 shows a part of a conveyor device.

FIG. 8 shows the way a trolley 29 is mounted to a continuous conveyor means of a conveyor device by using the described mounting element 1. For reasons of clarity, only a small section of the conveyor device is shown. What is illustrated here is a portion of the continuous conveyor means, which in the present case is a conveyor chain 30, as well as a part of the trolley 29 that has a cross-sorting device 31 that is known per se and therefore not described in detail.

As can be seen in FIG. 8, the trolley 29 is arranged above the conveyor chain 30. The mounting element 1 is arranged between the trolley 29 and the conveyor chain 30 and connected to both the trolley 29 and the conveyor chain 30. The mounting element 1 is mounted to the trolley 29 by means of two screws 32 that are engaged with the inside threads of the projections 26 while piercing through a housing wall 33 of the trolley 29, such that consequently, the second articulated part 3 is fixed at the housing wall 33 with its bottom wall 25. On the contrary, the mounting element 1 is movably articulated to the conveyor chain 30. To this end, in a link of the conveyor chain 30, a through hole that has not been illustrated in FIG. 8, is provided, which is permeable for the threaded end portion 17 and the center part 16 of the bolt element 4. For mounting the mounting element 1 to the conveyor chain 30, the bolt element 4 is removed from the side surfaces 6 and 7 of the first articulated part 2. The link having the through hole is arranged between the side surfaces 6 and 7 of the first articulated part 2 such that the through hole of the link is aligned with the third through hole 10 and the fourth through hole 11 in the side walls 6 and 7 of the first articulated part 2. With the threaded end portion 17 ahead, the bolt element 4 is sticked through the fourth through hole 11, the through hole in the link and the third through hole 10. The spacer sleeve 36 is being arranged at the threaded end portion 17. The bolt element 4 may also be sticked through the through holes 10, 11 and the hole of the conveyor chain 30 with spacer sleeve 36 arranged thereto. Subsequently the screw nut 20 is screwed onto the thread of the thread end portion 17 projecting from the third through hole 11 and is tightened. Due to the fact that the spacer sleeve 36 abuts the center part 16 of the bolt element 4, it is ensured that the screw nut 20 cannot be tightened too firmly which might result in the side walls 6 and 7 of the first articulated part 2 being bent or distorted or even end up in a restricted movability or rotatability of the first articulated part 2 relative to the conveyor chain 30. The spacer sleeve 36 rather determines the screwing path of the screw nut 19 at the thread of the thread end portion 17.

After the trolley 29 has been mounted to the conveyor chain 30 by means of the mounting element 1, the first articulated part 2 and the second articulated part 3 are movable relative to the conveyor chain 30 and the first articulated part 2 furthermore is movable relative to the trolley 29. As a result of the articulated connection between the first articulated part 2 and the second articulated part 3 and the articulated connection between the conveyor chain 30 and the first articulated part 2, the trolley 29 is conferred a great freedom of movement relative to the conveyor chain 30. When passing through semi-circular path portions, whose diameter is small in comparison with the extension of the trolley 29 in the conveying direction, the trolley 29 can therefore gradually move away from the conveyor chain 30 or change its alignment with regard to the conveyor chain 30, while, owing to the mounting element 1, the trolley 29 remains connected to the conveyor chain 30. The articulated design of the mounting element 1, however, enables such relative movement of trolley 29 and conveyor chain 30, wherein tensioning of the trolley 29 or of the conveyor chain 30 is reduced or even avoided. Herein, the conveyor chain 30 can move the trolley 29 via the mounting element 1 in both a tearing manner and a pushing manner.

LIST OF REFERENCE SIGNS

1 mounting element
2 first articulated part
3 second articulated part
4 bolt element
5 damping element
6 side wall
7 side wall
8 first through hole
9 second through hole
10 third through hole
11 fourth through hole
12 fifth through hole
13 bottom wall
14 screw
15 nut
16 center part
17 threaded end portion
19 screw head
20 screw nut
21 side wall
22 side wall
23 through hole
24 through hole
25 bottom plate
26 projection
27 screwed connection
28 screwed connection
29 trolley
30 conveyor chain
31 cross-sorting device
32 screw
33 housing wall
34a bearing bushing
34b bearing bushing
35a bearing bushing
35b bearing bushing
36 spacer sleeve

The invention claimed is:

1. A mounting element (1) for mounting a trolley (29) to a continuous conveyor means (30) of a conveyor device, the mounting member (1) comprising:

at least two articulately connected articulated parts (2, 3), wherein a first of the articulated parts (2) is set-up for articulation of the mounting element (1) to the continuous conveyor means (30) and a second of the articulated parts (3) is set-up for connecting the mounting element (1) with the trolley (29);

at least one elongated bolt element (4) that has a center part (16), a threaded end portion (17) having a thread, and a bolt head (19) opposite the threaded end portion (17); and at least first and second surface portions (6, 7) parallel to one another, the first surface portion (6) being provided with a first through hole (10) and the second surface portion (7) being provided with a second through hole (11), a first bearing bushing (34a) being provided in the first through hole (10) and a second bearing bushing (34b) being provided in the second through hole (11), a spacer sleeve (36) being arranged in the first bearing bushing (34a) and, together with the first bearing bushing (34a), forming a first slide bearing, and the bolt head (19) being arranged in the second bearing bushing (34b) and, together with the second bearing bushing (34b), forming a second slide bearing.

2. The mounting element (1) of claim 1, further comprising at least one damping means (5) for damping strokes of the mounting element (1) at the continuous conveyor means (30).

3. The mounting element (1) of claim 1, wherein at least one of the articulated parts (2, 3) is made of a sheet metal material.

4. The mounting element (1) of claim 1, wherein at least part of the mounting element (1) has a U-shaped cross-section.

5. A trolley (29) having the mounting element (1) of claim 1 that can be mounted to a continuous conveyor means (30) of a conveyor device with the mounting element (1), wherein the second articulated part (3) is connected with a part (33) of the trolley (29).

6. The trolley (29) of claim 5, further comprising a sorting device or a cross-sorting device (31).

7. A conveyor device having at least one continuous conveyor means (30) and at least one trolley (29) according to claim 5 that is mounted to the continuous conveyor means (30) by the mounting element (1), wherein the continuous conveyor means (30) is set-up to move the trolley (29) along a predetermined conveying path.

* * * * *